United States Patent
Lorentz et al.

(10) Patent No.: US 6,564,915 B2
(45) Date of Patent: May 20, 2003

(54) POWER TAKE-OFF CLUTCH CONTROL SYSTEM

(75) Inventors: Timothy A. Lorentz, Morton, IL (US); Kevin A. Vernagus, East Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/925,529

(22) Filed: Aug. 10, 2001

(65) Prior Publication Data

US 2003/0029691 A1 Feb. 13, 2003

(51) Int. Cl.$^7$ .............................................. B60K 41/22
(52) U.S. Cl. ................ 192/3.58; 192/85 R; 192/109 F; 74/15.06
(58) Field of Search .............................. 192/85 R, 3.58, 192/103 F; 74/11, 15.6, 15.63; 477/97, 174, 175, 176, 180

(56) References Cited

U.S. PATENT DOCUMENTS

| | | | |
|---|---|---|---|
| 3,237,404 A | * | 3/1966 | Flanigan et al. ......... 192/109 F |
| 3,851,463 A | * | 12/1974 | Robinson ..................... 60/281 |
| 5,053,960 A | | 10/1991 | Brekkestran et al. |
| 5,407,042 A | * | 4/1995 | Fukui et al. ................ 192/3.58 |
| 5,467,854 A | | 11/1995 | Creger et al. |
| 5,494,142 A | | 2/1996 | Kale |
| 5,984,034 A | | 11/1999 | Morisawa et al. |
| 6,022,292 A | | 2/2000 | Goodnight |
| 6,070,538 A | * | 6/2000 | Flamme et al. ............. 111/170 |
| 6,092,021 A | | 7/2000 | Ehlbeck et al. |
| 6,112,870 A | * | 9/2000 | Fukumoto .................. 192/3.58 |
| 6,119,072 A | | 9/2000 | Eastman |
| 6,129,187 A | * | 10/2000 | Bellanger et al. .......... 192/3.58 |
| 6,151,543 A | | 11/2000 | McKee et al. |
| 6,151,975 A | | 11/2000 | Kirkpatrick et al. |
| 6,165,102 A | | 12/2000 | Bellinger |
| 6,186,925 B1 | | 2/2001 | Bellinger |
| 6,193,630 B1 | * | 2/2001 | Janasek et al. ............. 477/149 |
| 6,206,803 B1 | | 3/2001 | Baer et al. |

OTHER PUBLICATIONS

Development of Control Systems, Encyclopædia Britannica Online, http://www.search.eb.com, pp. 1–4.*

* cited by examiner

Primary Examiner—Saul Rodriguez
(74) Attorney, Agent, or Firm—Finnegan, Henderson, Farabow Garrett & Dunner, LLP; Steve M Hanley

(57) ABSTRACT

A method is provided for controlling a PTO clutch of a transmission subject to a varying inertial load. The method includes providing a signal to a pressure control valve selectively engaged with the PTO clutch configured to engage a drive source of the transmission with an implement. The signal to the pressure control valve is modulated based on a single predetermined profile.

20 Claims, 4 Drawing Sheets

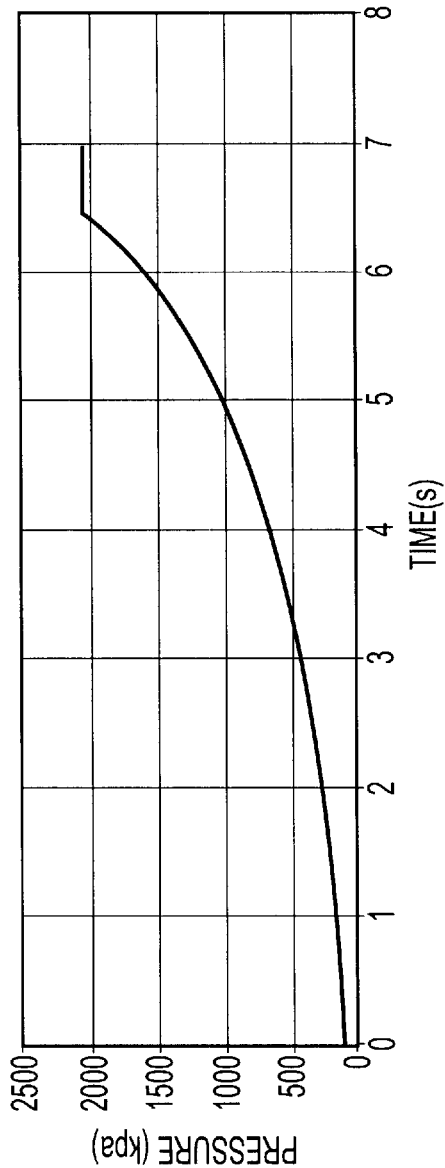

POWER TAKE-OFF CLUTCH CONTROL SYSTEM

TECHNICAL FIELD

This invention relates to a system for controlling a power take-off clutch used in a transmission. More particularly, the invention is directed to a method and system for controlling a power take-off clutch that modulates a clutch pressure.

BACKGROUND

A power take-off (PTO) clutch is often used in an agricultural vehicle, such as, for example, a tractor, to provide power to its implements. The vehicle is powered by a motor or an engine, and equipped with a transmission having gear elements. Generally, a PTO clutch is located in the transmission to transmit torque from the motor to the implements, and engageable to transfer the torque from the motor to the implement through the clutch. The engagement of the clutch require precise timing to achieve smooth and high quality operation of the vehicle.

For example, U.S. Pat. No. 5,467,854 discloses a method of controlling a clutch-to-clutch shift for a transmission. The transmission includes a plurality of clutches, pressure control valves individually connected to the clutches, and an electronic control module. The control module receives a gear selection signal and responsively controls the operation of the pressure control valves. The shift operation of the transmission includes a modulation phase to gradually increase a clutch pressure to cause a desired decrease in clutch slip.

A PTO clutch, however, may face an unique problem because the PTO clutch is often operated under a wide range of implement loads. It is difficult to achieve precise timing of the PTO clutch engagement partly because the inertia of the implements can vary significantly. For example, a tractor pulling a combine or a mower endures higher inertia than one operating without an implement. The clutch engagement timing for low implement inertia or load may substantially differ from that for high implement inertia or load. As a result, it is difficult to operate a PTO clutch smoothly.

To solve this problem, a PTO clutch control system may be equipped with multiple clutch engagement timing settings. In the vehicle with multiple or alternative PTO clutch settings, an operator is required to manually select one of the clutch engagement timing settings based on the anticipated implement load. When the vehicle is subject to a different load, the operator accordingly selects the suitable setting. Such a system, however, does not fully accommodate load variation during operation of the implement. Moreover, changing settings during operation is inconvenient.

The present invention provides a PTO clutch control system allowing high quality operation overcoming one or more of the problems as set forth above.

SUMMARY OF THE INVENTION

In one aspect of the invention, a method is provided for controlling a PTO clutch of a transmission subject to a varying inertial load. The method includes providing a signal to a pressure control valve selectively engaged with the PTO clutch configured to engage a drive source of the transmission with an implement. The signal to the pressure control valve is modulated based on a single predetermined profile.

In another embodiment, a power take-off clutch control system for controlling a PTO clutch is provided. The control system includes a pressure control valve to actuate the clutch, and a control unit in communication with the pressure control valve. An input signal to the pressure control valve tracks a single predetermined profile.

In yet another embodiment, a vehicle is provided with a motor, a transmission coupled to the motor and having a PTO clutch, a pressure control valve coupled to the clutch to actuate the clutch, and a control unit coupled to the pressure control valve for providing a signal to the pressure control valve. The signal includes a single profile modulation signal to control clutch pressure over a varying load. A drive train is coupled to the transmission.

It is to be understood that both the foregoing general description and the following detailed description are exemplary and explanatory only and are not restrictive of the invention, as claimed

BRIEF DESCRIPTION OF THE DRAWINGS

The accompanying drawings, which are incorporated in and constitute a part of this specification, illustrate embodiments of the invention and together with the description, serve to explain the principles of the invention.

FIG. 4 is a graph illustrating an exponential relationship between the clutch pressure and time; and FIG. 5 is a table showing parameters corresponding to PTO clutch operation in accordance with FIG. 4.

DETAILED DESCRIPTION

Reference will now be made in detail to the present preferred embodiments of the invention, examples of which are illustrated in the accompanying drawings. Wherever possible, the same reference numbers will be used throughout the drawings to refer to the same or like parts.

Figure 1:
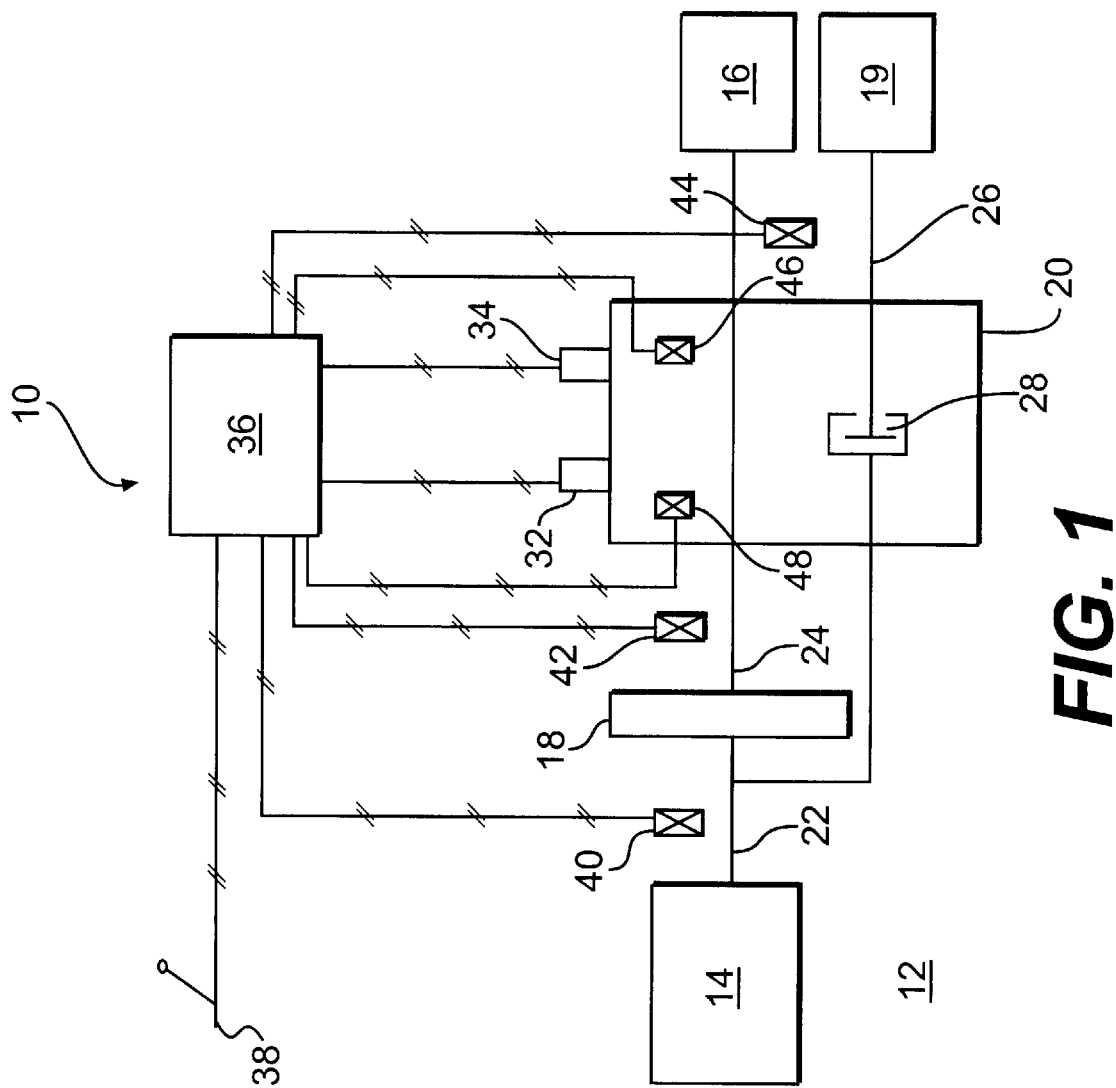
FIG. 1 illustrates a schematic and diagrammatic representation of a PTO clutch control system according to one embodiment of the present invention.

FIG. 1 illustrates one embodiment of a power take-off (PTO) clutch control system 10 suitable for a vehicle 12, such as a tractor. The vehicle 12 typically has a motor or an engine 14 as a drive source, a drive train 16, and a transmission 20 having a PTO clutch. The vehicle 12 may also have a torque converter 18. The engine 14 is connected to the torque converter 18 via a shaft 22, the torque converter 18 is connected to the transmission 20 via a shaft 24, and the transmission 20 may be connected to the vehicle drive train 16. The PTO clutch is engageable with the engine 14 via, for example, an input shaft 24, and in turn, directly engages an implement 19 via a PTO output shaft 26.

The PTO clutch control system 10 is utilized with a PTO clutch 28, which may be, for example, a hydraulic actuated clutch. The transmission 20 can be shifted or switched by selectively engaging and disengaging the PTO clutch 28. The PTO clutch 28 is selectively engaged and disengaged by pressure control valve 32. In an exemplary embodiment, the pressure control valve 32 is actuated by a solenoid.

The PTO clutch control system 10 also includes a displacement pump coupled to the PTO clutch 28 to supply pressurized hydraulic fluid from a reservoir to the PTO clutch 28 through the pressure control valve 32. The system 10, moreover, may have a relief valve to regulate fluid pressure of the hydraulic fluid. (The pump, the reservoir, and the relief valve are not shown in FIG. 1.)

The PTO clutch control system 10 further includes a control unit 36 coupled to the pressure control valve 32 and an operator switch 38, which produces a PTO input signal. The operator of the vehicle 12 manipulates the operator switch 38 to operate the PTO clutch 28 via the control unit 36.

Upon receipt of the PTO switch input signal, the control unit 36 sends a command signal to the pressure control valve 32 to responsively control the operation of the pressure control valve 32. The control unit 36 may also receive various other input signals that affect PTO clutch operation. Such input signals may include an engine speed signal from an engine speed sensor 40, a transmission input speed signal from a PTO transmission input speed sensor 42, a PTO output speed signal from a PTO output speed sensor 44, a temperature signal from a transmission oil temperature sensor 46, and a clutch pressure signal from a PTO clutch pressure sensor 48. The sensors may be conventional electrical transducers, such as, for example, potentiometers and/or magnetic speed pickups. The control unit 36 may consider the values of the input signals to determine a desired command signal to the control pressure valve 32. For example, as the hydraulic fluid temperature of the transmission 20 decreases, the viscosity of the hydraulic fluid increases, which affects the fill time of the PTO clutches. Moreover, as the engine speed decreases, the hydraulic fluid flow decreases and the PTO clutch may fill slower. Thus, the control unit 36 needs to compensate the fill time for the PTO clutch 28 according to input signals to achieve high quality operation of the PTO clutch 28.

The control unit 36 may include a microprocessor with an internal clock and memory, an input/output device, and an array of proportional solenoid current drivers. One solenoid driver is dedicated to the pressure control valve 32. In an exemplary embodiment, the control unit 36 delivers the command signal proportional to the desired solenoid current, and the current driver uses a Pulse Width Modulated voltage to produce the desired current. The pressure control valve 32 is configured to provide a hydraulic fluid flow to the PTO clutch 28 sufficient to maintain a clutch pressure proportional to the solenoid current. As a result, the control unit 36 controls the clutch pressure of the PTO clutch 28 by providing the solenoid driver circuit with the command signal proportional to the clutch pressure.

The control unit 36 includes PTO control logic (PCL). The PCL monitors the operator controls, such as the operator switch 38, and various other input signals to determine the desired PTO engagement profile. The desired PTO engagement profile is then passed to a Clutch Control Logic (CCL) to handle engagement and disengagement of the PTO clutch.

The CCL may generate command signals in units of pressure, such as kPa, and the command signals may be converted into current through a linearization process before being provided the pressure control valve 32. The linearization process compensates for many non-linearities and variabilities of the pressure control valve 32, and the conversion of the command signals may be calibrated. The command signals are then sent to the pressure control valve to engage and disengage the PTO clutch according to a PTO clutch engagement status requested by the PCL. The PCL and CCL may be software programs typically stored in memory, such as read-only memory or random-access memory.

The PTO clutch control system 10 may utilize a finite state machine model to operate the PTO clutch 28. Generally, a finite state machine model has a finite number of discrete conditions that must respond to a limited number of events. Each of the possible conditions is designated as a state, and in each state, decisions must be made as to how to respond to each of the possible events. The system with the finite state machine model may transition from one state to another state, remain in the present state, or take some action in response to the event.

Figure 2:
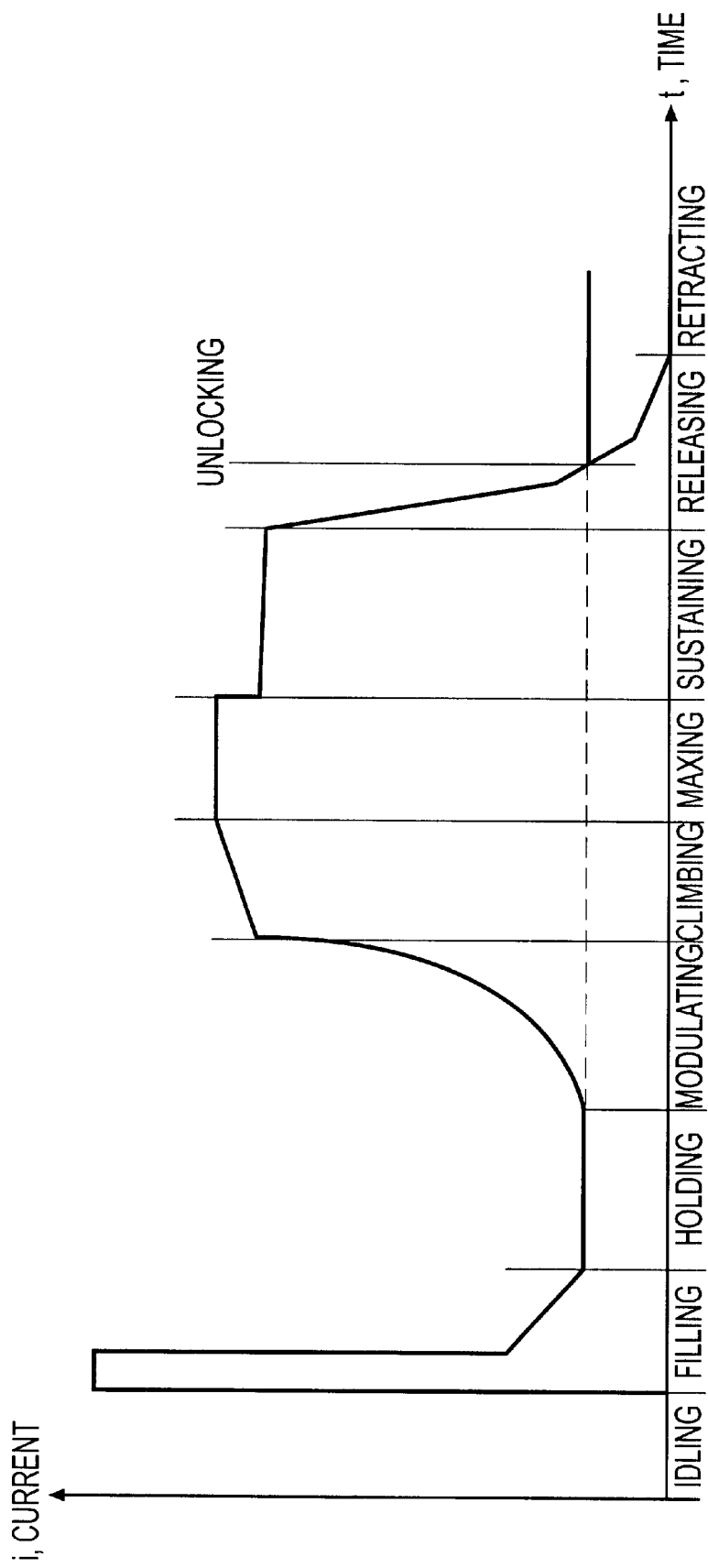
FIG. 2 is a graphical relationship between a valve command signal and each of finite states of the PTO clutch control system.

FIG. 2 illustrates the relationship between the command signal (current) provided to pressure control valve 32 with respect to each of the finite states during the operation of the PTO clutch control system 10. In one embodiment, the PTO clutch control system 10 has multiple states, such as idling, filling, holding, modulating, climbing, maxing, sustaining, releasing, retracting, and unlocking. Before torque is transmitted between the engine 14 and the implement 19, a fill time occurs. The fill time is the elapsed time wherein the PTO clutch 28 moves from the released to the engaged position.

Once the PTO clutch 28 is filled, the PTO control system 10 may enter into the modulation state. The end-of-fill of the PTO clutch 28 may be predetermined or sensed by various methods. For example, dedicated end-of-fill detection sensors, timing methods, or other known end-of-fill detection methods may be employed to indicate the end-of-fill. Also, clutch-slip may be monitored.

In the modulation state, the PTO clutch 28 is actuated by the pressure control valve 32 to achieve a desired clutch pressure against the off-going PTO clutch. As illustrated in FIG. 2, the command signal is sent from the control unit 36 to the pressure control valve 32 to gradually increase the clutch pressure of the PTO clutch 28 until the PTO clutch 28 locks up. The modulation state may utilize either open-loop or closed-loop control to gradually increase the clutch pressure to cause a desired decrease in clutch slip. In the open-loop configuration, the command signal to control clutch pressure is modulated at a predetermine rate. In the closed-loop configuration, on the other hand, the command signal is modulated by feeding back values based on a function of some other parameter. The clutch pressure is gradually increased to a maximum pressure level to complete the engagement.

A vehicle may often be operated under various inertial loads, which adversely affects smooth PTO clutch engagement. For example, the PTO clutch may be subject to a widely varying implement inertia. In order to achieve smooth PTO clutch engagement for the vehicle 12 subject to different inertial loads, a pressure profile that achieves smooth PTO clutch engagement from low to high inertia is required.

In contrast to previous PTO clutch systems that are prone to performance degradation depending on the implement loading conditions, the present invention, as described in the exemplary PTO clutch control system 10, utilizes a single predetermined profile that accommodates virtually any implement loading condition exerted on the PTO clutch. In an exemplary embodiment, an exponential function with a single profile may be used to determine the command signal during the modulation state. Consequently, by using the single profile, the operator of the vehicle need not change profiles of the command signal during the operation of the PTO clutch control system, and the PTO clutch 28 can be operated automatically. The single profile modulation accommodates a significant range of loads, resulting in smooth engagement of the PTO clutch.

In one embodiment, the single profile of the valve command signal during the modulation state may be generated using the following exemplary exponential functions:

1. Inverse Exponential: $Y=A+B/e^X$;
2. Exponential: $Y=A+Be^X$; and
3. Exponential: $Y=A(e^{BX})$, where Y=pressure, X=Time, and A and B=constants.

Constant A defines a start point at the origin (time=0), and Constant B defines a rate of modulation, i.e., the speed the curve reaches the maximum point.

Also, the single profile may be a piece-wise linear approximation of a non-linear function. By connecting small linear segments or pieces that closely approximate a non-linear function, a single profile of the desired nonlinear function can be created.

Figure 3:
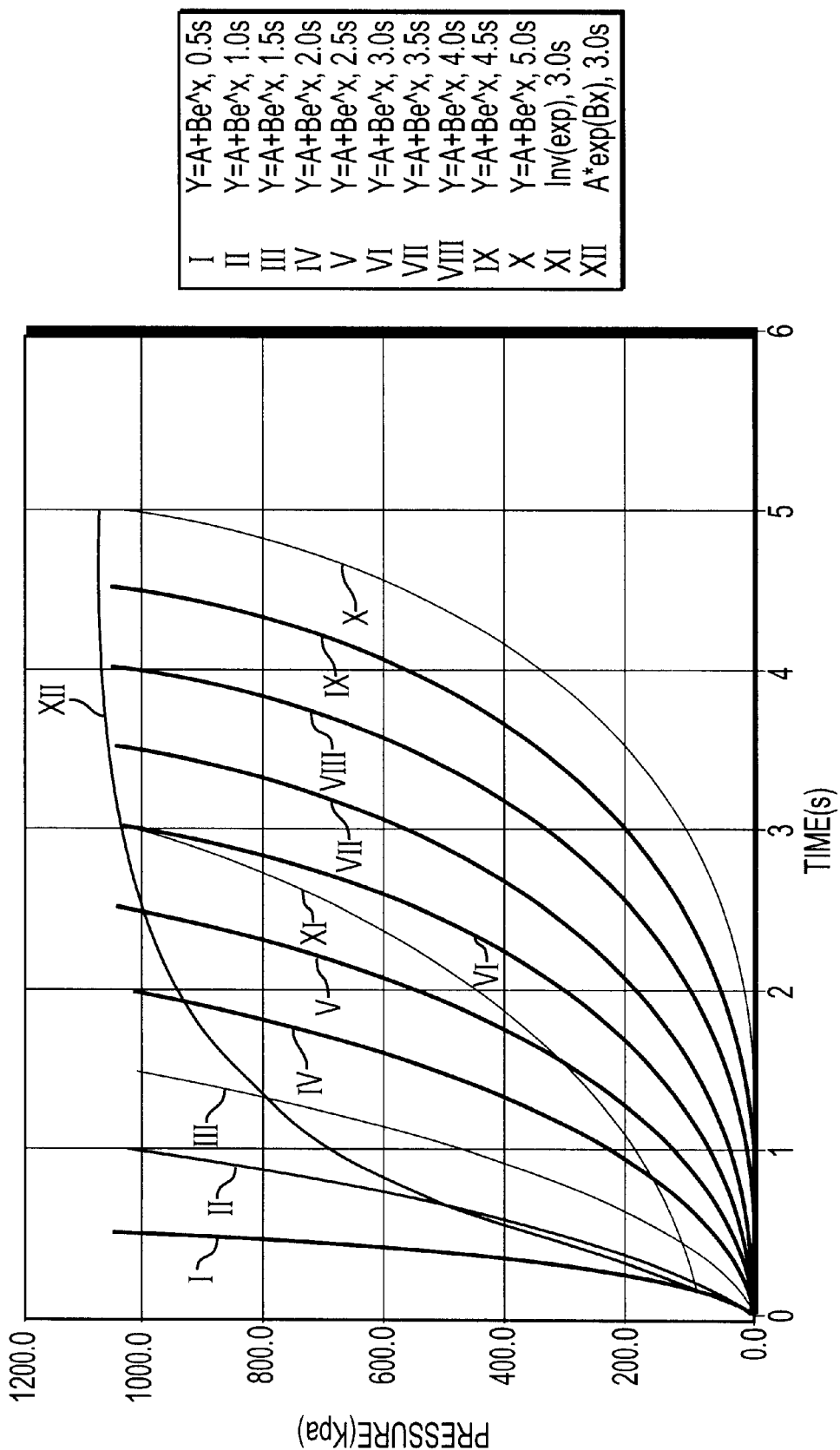
FIG. 3 is a graph illustrating relationships between the PTO clutch pressure over a period of time.

FIG. 3 illustrates the relationship between the clutch pressure and time using the above exponential functions with different constants. The graphs in FIG. 3 were plotted by using one of the three exponential equations above. For the equation $Y=A+Be^X$, the graphs were plotted for modulation times of 0.5, 1, 1.5, 2, 2.5, 3, 3.5, 4, 4.5, and 5 seconds. For the equations $Y=A+B/e^X$ and $Y=A(e^{BX})$, the modulation time of 3 seconds was used to plot the graphs. A and B can be selected according to a desired top clutch pressure.

FIG. 4 illustrates an exemplary relationship between clutch pressure and time during modulation. FIG. 5 provides various operational parameters for three inertial loading conditions (1, 15, and 30 Nms$^2$).

Industrial Applicability

The operation of the PTO clutch control system 10 illustrated in FIG. 1 is described hereafter. As shown in FIG. 2, the PTO clutch control system 10 is initially in the idling state. In the idling state, the PTO clutch 28 is disengaged and fully retracted. When the operator selects to engage the PTO clutch 28 by actuating the operator switch 38, the PTO clutch control system 10 proceeds to the filling state.

In the filling state, the PTO clutch 28 is stroked to remove the clearance between clutch plates and disks. The command signal from the control unit 36 to the pressure control valve 32 is typically a pulse, followed by a ramp down to a hold level, at which the PTO clutch 28 is nearly touched up. At the touch-up point, the PTO clutch 28 may not be transmitting torque, but is ready to engage.

In the holding state, touch-up of the PTO clutch 28 is carefully controlled to prevent a sudden increase in torque capacity, resulting in a sudden jolt. During the holding state, a low pressure (initial pressure) is maintained to gently touch up the PTO clutch 28, thereby reducing any end-of-fill torque spike.

During the modulating state, the command signal is ramped up in either an open-loop (at a predetermined rate) or a closed-loop (as a function of some other parameter) until the PTO clutch 28 locks up. The command signal may be modulated by a single predetermined profile function to control the clutch slip. In the exemplary embodiment, an open-loop function, such as the relationship illustrated in FIG. 4, is used to modulate the command signal.

In the climbing state, the command signal is ramped up to the maximum clutch pressure over a specified period of time to ensure that the PTO clutch 28 is fully locked up. Further, during the maxing state, the PTO clutch 28 continuously maintains the maximum clutch pressure.

In the sustaining state, which follows the maxing state, the clutch pressure may be reduced from the maximum and maintained at the reduced clutch pressure. The clutch pressure is reduced to improve seal life of the PTO clutch 28.

When commanded by the operator, the PTO clutch begins disengagement by moving to the releasing state. In the releasing state, the PTO clutch 28 begins disengagement (unlocking) as the command signal is ramped down to zero pressure. In an exemplary embodiment, the releasing state may include multiple segment ramps.

The releasing state may be followed by the retracting state. Even though the command signal may be zero, the PTO clutches may not be fully retracted due to delay in clutch response time. For re-engagement (filling) from the retracting state, therefore, it may be necessary to use a different fill profile than for re-engagement from the idling state.

The unlocking state is similar to the releasing state. Unlike the releasing state, however, the hold level is maintained in the unlocking state. This feature may be used to partially disengage the PTO clutch when an immediate re-engagement is anticipated.

Thus, the present invention provides a system and method that can smoothly and effectively engage a PTO clutch over a wide variety of loads. The system and method have application in a wide variety of machines, including, but not limited to, construction and agricultural vehicle.

It will be apparent to those skilled in the art that various modifications and variations can be made in the PTO clutch control system of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for controlling a PTO clutch of a transmission being subject to a varying inertial load, comprising:

providing an electrical signal to a pressure control valve selectively engaged with the PTO clutch configured to engage a drive source of the transmission with an implement; and modulating the signal to the pressure control valve based on a single predetermined profile of clutch pressure with respect to time.

2. The method of claim 1, wherein the single profile is a non-linear function.

3. The method of claim 2, wherein the single profile is an exponential function.

4. The method of claim 1, wherein the signal is modulated by a closed loop control.

5. The method of claim 1 wherein the single profile is a piece-wise linear approximation of a non-linear function.

6. The method of claim 1, wherein the signal provided to the pressure control valve is determined by considering at least one of an engine speed signal, a transmission input speed signal, a PTO output speed signal, a temperature signal, and a clutch pressure signal.

7. The method of claim 1, further including engaging the PTO clutch at a full clutch pressure.

8. The method of claim 1, wherein the signal is modulated by an open loop control.

9. A method for controlling a PTO clutch of a transmission being subject to a varying inertial load, comprising:

providing a signal to a pressure control valve selectively engaged with the PTO clutch configured to engage a drive source of the transmission with an implement; and modulating the signal to the pressure control valve based on a single predetermined profile, wherein the single profile is one of the following non-linear, exponential functions:

$Y=A+B/e^X$;

$Y=A+Be^X$;

and $Y=A(e^{BX})$, where Y is a clutch pressure, X is time, and A and B are constants.

10. A power take-off clutch control system for controlling a PTO clutch, the system comprising:

a pressure control valve to actuate the clutch; and a control unit in communication with the pressure control valve, the control unit being configured to provide an electrical input signal to the pressure control valve and modulate the input signal based on a single predetermined profile of clutch pressure with respect to time.

11. The system of claim 10, wherein the predetermined profile is based on a non-linear function.

12. The system of claim 11, wherein the predetermined profile is based on an exponential function.

13. The system of claim 10, wherein the input signal is controlled by an open loop system.

14. The system of claim 10, wherein the profile is a piece-wise linear approximation of a non-linear function.

15. The system of claim 10, wherein the input signal is controlled by a closed loop system.

16. The system of claim 10, wherein the control unit receives at least one of an engine speed signal, a transmission input speed signal, a PTO output speed signal, a temperature signal, and a clutch pressure signal, and provides the signal to the pressure control valve based on the received signal.

17. A power take-off clutch control system for controlling a PTO clutch, the system comprising:
   a pressure control valve to actuate the clutch; and
   a control unit in communication with the pressure control valve, wherein an input signal to the pressure control valve tracks a single predetermined profile, wherein the predetermined profile is based on a non-linear, exponential function, and is based on one of the following functions:

$Y=A+B/e^X$;

$Y=A+Be^X$;

and $Y=A(e^{BX})$, where Y is a clutch pressure, X is time, and A and B are constants.

18. A power take-off clutch control system for controlling a PTO clutch, the system comprising:
   a pressure control valve to actuate the clutch; and
   a control unit in communication with the pressure control valve, wherein an input signal to the pressure control valve tracks a single predetermined profile, wherein the input signal gradually increases the clutch pressure between an on-coming clutch and an off-going clutch of the PTO clutch.

19. A vehicle, comprising:
   a motor;
   a transmission coupled to the motor and having a PTO clutch;
   a pressure control valve coupled to the PTO clutch to actuate the PTO clutch;
   a control unit coupled to the pressure control valve for providing an electrical signal to the pressure control valve, the signal including a single profile modulation signal of clutch pressure with respect to time to control the clutch pressure suitable over a varying load; and
   a drive train coupled to the transmission.

20. The vehicle of claim 19, wherein the modulation signal is based on a non-linear function.

* * * * *